(12) United States Patent
Da Silva Fernandes et al.

(10) Patent No.: US 8,160,980 B2
(45) Date of Patent: Apr. 17, 2012

(54) INFORMATION SYSTEM BASED ON TIME, SPACE AND RELEVANCE

(75) Inventors: Theo Rangel Correia Da Silva Fernandes, Lisbon (PT); Pedro Nuno Rodrigues Cardoso, Lisbon (PT); José Carlos Dos Santos Danado, Montemor-o-Novo (PT); Tiago Miguel Da Conceição Bilou, Alcabideche (PT); Fernando Manuel Nabais, Lisbon (PT); João Pedro Tojal Loia Soares Silva, Lisbon (PT)

(73) Assignee: Ydreams—Informatica, S.A., Caparica (PT)

( * ) Notice: Subject to any disclaimer, the term of this patent is extended or adjusted under 35 U.S.C. 154(b) by 929 days.

(21) Appl. No.: 12/171,892

(22) Filed: Jul. 11, 2008

(65) Prior Publication Data

US 2009/0037354 A1    Feb. 5, 2009

Related U.S. Application Data

(60) Provisional application No. 60/929,833, filed on Jul. 13, 2007.

(51) Int. Cl.
  G06F 17/00    (2006.01)
  G06N 5/00    (2006.01)
(52) U.S. Cl. .............................. 706/45; 706/46; 706/62
(58) Field of Classification Search .................. None
  See application file for complete search history.

(56) References Cited

U.S. PATENT DOCUMENTS

| 7,194,235 B2* | 3/2007 | Nykanen et al. | 455/3.01 |
| 7,945,585 B1* | 5/2011 | Sorkin et al. | 707/784 |
| 2006/0069749 A1* | 3/2006 | Herz et al. | 709/219 |
| 2008/0195954 A1 | 8/2008 | Dharmarajan et al. | |

OTHER PUBLICATIONS

Shek et al., E., "Dynamic Multicast Information Dissemination in Hybrid Satellite-Wireless Networks", ACM, pp. 1-6, 1999.*
Velasco et al., C., "Universal Access to Information Services—The Need for User Information and its Relationship to Device Profiles", Springer-Verlag, pp. 1-8, Feb. 17, 2004.*
Sodergard et al., C., "Integrated Multimedia Publishing: Combining TV and Newspaper Content on Personal Channels", Elsevier, pp. 1-18, 1999.*
Kolodziej et al., K., "In-Building Positioning: Modeling Location for Indoor World", Proceedings of the 15th International Workshop on Database and Expert Systems Applications, pp. 1-5, 2004.*
Kawsar, Fahim, et al., "Personalization and Context Aware Services: A Middleware Perspective," UbiPCMM06: 2nd International Workshop on Personalized Context Modeling and Management for UbiComp Applications, Sep. 18, 2006, California (9 pages).
Thawani, A. et al., "Context Aware Personalized Ad Insertion in an Interactive TV Environment," Applied Research Group, Bangalore, India (7 pages), 2004.
Barkhuus, L. et al., "Is Context-Aware Computing Taking Control Away From the User? Three Levels of Interactivity Examined," Proceedings of UbiComp 2003, (8 pages).

* cited by examiner

*Primary Examiner* — Jeffrey A Gaffin
*Assistant Examiner* — Adrian Kennedy
(74) *Attorney, Agent, or Firm* — King & Spalding L.L.P.

(57) ABSTRACT

An information system based on time, space and relevance is provided. The system comprises a client that displays information in a user-friendly manner and is located in a domestic environment; a proxy that handles the collection and parsing of data; a server that gathers usage data from the client; a database data mining cluster that allows for user profiling and time, space and relevance analysis; a set of information channels, which are periodically updated, and upon which automatic suggestions are given based on a user profile.

13 Claims, 4 Drawing Sheets

| Year | Month | Day | Hour | Minutes | Userid | Pag. Level 1 | Pag. Level 2 | Pag. Level 3 | Interaction Time | User Space 1 | User Space 2 | User Space 3 | Content Space 1 | Content Space 2 | Content Space 3 |
|---|---|---|---|---|---|---|---|---|---|---|---|---|---|---|---|
| 2007 | 1 | 1 | 10 | 12 | 175 | 1 | 2 | 1 | 1 | Africa | Angola | Luanda | Africa | Angola | Luanda |
| 2007 | 1 | 1 | 15 | 10 | 176 | 1 | 2 | 3 | 2 | Europe | England | London | Europe | England | London |
| 2007 | 1 | 2 | 16 | 0 | 174 | 2 | 0 | 0 | 1 | Europe | Portugal | Lisbon | Europe | Portugal | Lisbon |
| 2007 | 3 | 10 | 11 | 5 | 176 | 2 | 3 | 0 | 1 | Europe | England | London | | | |
| 2007 | 3 | 10 | 16 | 50 | 174 | 2 | 3 | 1 | 3 | Europe | Portugal | Lisbon | Europe | Portugal | Lisbon |
| 2007 | 2 | 15 | 20 | 41 | 175 | 2 | 3 | 1 | 2 | Africa | Angola | Luanda | | | |
| 2007 | 3 | 10 | 12 | 15 | 176 | 2 | 3 | 1 | 2 | Europe | Portugal | Lisbon | Europe | England | London |
| 2007 | 4 | 5 | 13 | 10 | 175 | 2 | 3 | 3 | 3 | Europe | Portugal | Porto | | | |
| 2007 | 4 | 10 | 12 | 0 | 176 | 2 | 3 | 3 | 1 | Europe | Portugal | Lisbon | | | |
| 2007 | 3 | 10 | 17 | 15 | 174 | 2 | 3 | 4 | 2 | Europe | Portugal | Lisbon | Europe | Portugal | Lisbon |
| 2007 | 3 | 10 | 17 | 20 | 174 | 2 | 3 | 5 | 3 | Europe | Portugal | Lisbon | | | |
| 2007 | 4 | 5 | 13 | 12 | 175 | 3 | 3 | 2 | 1 | Europe | England | London | Europe | England | London |

Figure 4

| Pag. Level 1 | Pag. Level 2 | Pag. Level 3 | Probability | average interaction time | Weight |
|---|---|---|---|---|---|
| 2 | 3 | 0 | 10% | 1 | 10% |
| 2 | 3 | 1 | 30% | 2.33 | 70% |
| 3 | 3 | 2 | 1% | 1 | 1% |
| 2 | 3 | 3 | 20% | 2 | 40% |
| 2 | 3 | 4 | 10% | 2 | 20% |
| 2 | 3 | 5 | 10% | 3 | 30% |

Figure 5

INFORMATION SYSTEM BASED ON TIME, SPACE AND RELEVANCE

This application claims priority from U.S. Provisional Application No. 60/929,833, filed on Jul. 13, 2007, the disclosure of which is incorporated herein by reference in its entirety.

This invention relates to information access and automatic profiling which provides for cyclical influence of accessed information.

BACKGROUND OF THE INVENTION

RSS feed readers and widgets are common in the present day, thereby providing specific information of interest to the user. This contrasts with the domestic environment, where many devices with redundant functions are found. Many times, some of the distinctive features of a particular apparatus end up not being used; all of this while low level data such as time of day or weather forecasts are the most accessed data type.

The present invention relates to providing, in real-time, low-level everyday data in an efficient way.

A problem with weather forecasts, for instance, is that typically a device must be switched on for the information to be available, be it a TV or a computer, for example. On the TV one will only have the weather forecast at some particular times, and outside of those time windows one must resort to teletext (where available) to access the information.

With personal computers there is the typical boot-time, and then, if one is not using widgets, one typically accesses a webpage to get the data.

Both of these methods imply a period of waiting and memorizing the number of the page, the webpage or the simple fact that the web page is in a list in a browser.

Domotics is a flourishing field. Traditionally, domotics concerns the control of household appliances from a central point. The present invention does not deal with control, but with display.

SUMMARY OF THE INVENTION

The present invention is a new concept, function and format of delivery, and while some of its components are in the state of the art, no other system provides the level of ease in accessing common information that can be achieved in accordance with exemplary embodiments of the present invention.

YDreams has been developing the concept for some time, but now expands it to the current invention considerably through the implementation of Time, Space and Relevant filtering, which is an exemplary aspect of this invention.

An exemplary embodiment of the present invention relates to a concept for an increased availability of information, relying on the ease of access and patterned display.

An exemplary embodiment of the present invention can expand the state of the art on information customization by integrating an automated process of empiric channel selection according to a user profile.

The system relies on a local client and a proxy, which can be fully located on the client itself, or rather on a separate server.

Basic data such as weather forecasts, temperature, news etc. can be displayed to the user. By the user's choice of display, a profile can be constructed which suggests to the user alternative channels that match the user's profile but not the user's current selection.

DETAILED DESCRIPTION OF EXEMPLARY EMBODIMENTS OF THE INVENTION

Figure 1:
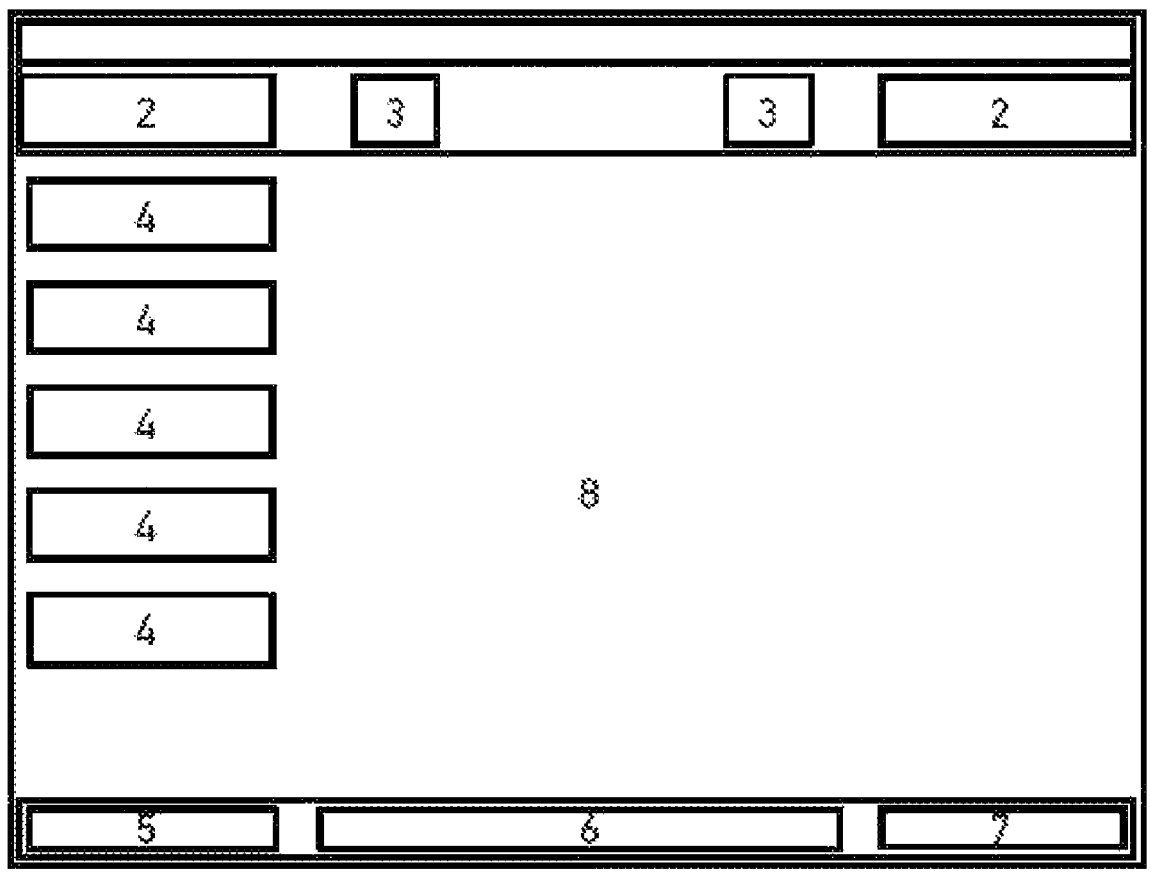
FIG. 1—Schematic view of the system under operation according to an exemplary.
Figure 2:
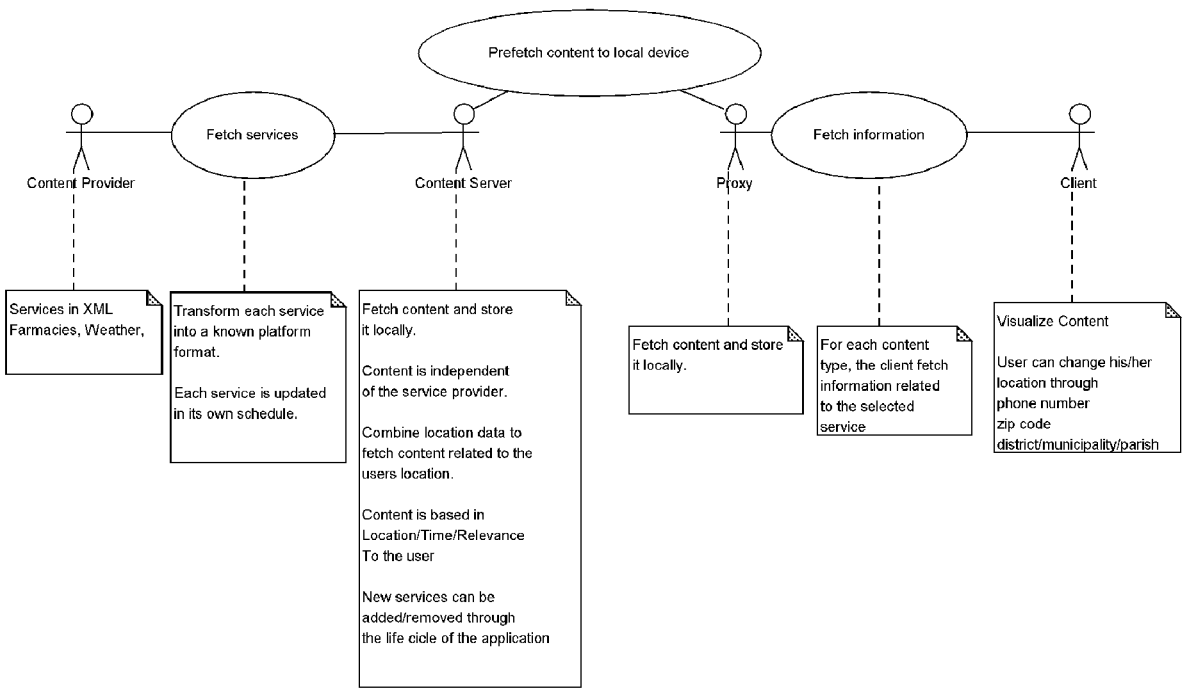
FIG. 2—UML, overall information flow diagram
FIG. 3—UML, data process diagram
FIG. 4—Table with the data structure for the data base records
FIG. 5—Table for an example of data supporting a channel suggestion
Figure 3:
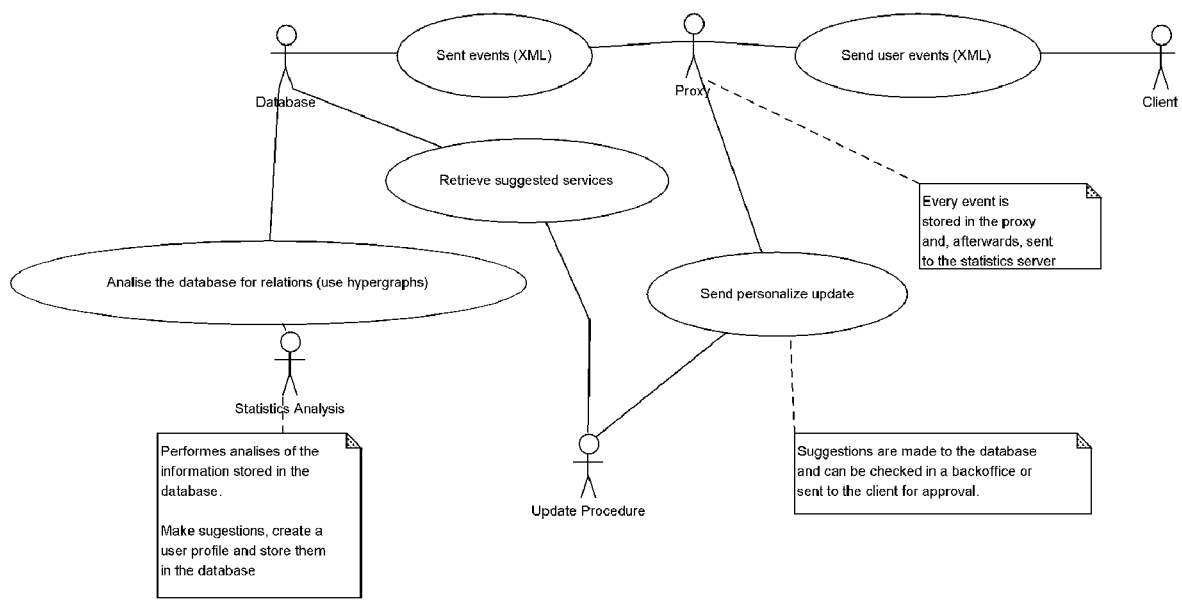

FIG. 1 is a schematic view of the system under operation.

A small factor computer has a frame (1) and a touch screen (8). The main menus (2) allow for the first level of navigation and determine the context for the second level of navigation: the secondary menus (4), which trigger content to be displayed in the area to their right.

Low level data (e.g. temperature) is displayed in areas (3), which can alternatively serve to place a device.

Time information is displayed on area (6), while emergency numbers and configuration information can be accessed through buttons (7) and (5), respectively.

The information displayed may include but is not limited to nearby pharmacies, nearby restaurants, movies on display (e.g. allowing query by movie and place), time, weather, news, sport news, and/or horoscopes.

The system is a quality of life solution developed in view of residential housing complexes, for supplying information based on time, space and relevance therein. The system is made up of several interdependent subsystems, the client and the supporting infrastructure. The client includes a user-friendly interface and a proxy. The user interface is based in a touch screen placed inside the home to provide quick and easy access to a range of services including the information listed in the former paragraph, and also other functions such as digital photo frame. The proxy pre-fetches information for rapid access. The information provided to the user is based on the user's location and profile. Information is based in channels catalogued in a directory with levels of information and related-location. The usage of the system determines the suggestion of new services to the user.

The supporting infrastructure involves a database collecting information related to the users' usage of the system, a web portal for system administration, and a statistics analyzer to study the information and perform channel suggestions for each user. Additionally, the server can also pre-fetch client information, allowing thin clients with reduced processing power to be used within the proposed system. The database allows analysis of users' usage and to perform profiles leading to suggesting information channels that best fit their profiles.

A portal for system administration is also included allowing the addition, modification or removal of services to/from the system, along with system related parameters, emergency contacts, and location-based events relevant to the user.

The proxy module requests extensible markup language (XML)-based services and converts the provided information to the system format. This allows for seamless integration of different content providers for different information channels. The proxy also registers users' preferences, performs updates of the application and sends statistics to the database. In case of thin clients, the content can be pre-fetched into a server module, named a Content Server, and afterwards requested by the thin client.

The content within the proxy is time, location and user tagged. Information in the information channel is time tagged; the last information retrieved is the most relevant for the moment. When applied, the proxy is also able to fetch information within an information channel related to the client location. Configuration files are used to select the correct parameters to select relevant information within the XML-based service.

Besides XML-based information, the system is also able to fetch and navigate within maps to visualize location based content. The location-based content appears through the usage of a collection of layers that the user can select based in his or her interests.

The system also incorporates automatic updates to seamlessly integrate new functionalities during the course of the system life cycle. Periodically, the proxy checks the web administration portal for updates and system-related information according to the functionalities integrated within the system.

Statistics are collected within the user interface and sent to the proxy. By this tiered process, the system guarantees that statistical information is not lost due to network failure.

The proxy also integrates contacts, to-do lists and calendar functionalities.

For different processing loads, the proxy may reside entirely on the client, or run partially on a server.

The client has a hierarchical way to access information through different depths of information also reflected in Catalogue Directory stored within the Web Administration Portal. In the first information level, the user can find, for example access to information, services, SOS and Maintenance functionalities. SOS allows for fast access to emergency contacts, and maintenance allows for system customization, namely related location, approval of system services suggestions, themes customization, user identification and screensaver parameters.

Location based information is customized through introduction of the user's location-based reference, namely a landline phone number, a zip code or selection of district, municipality and parish. Moreover, when the screensaver is customized, the system automatically updates media content that will be shown, through the usage of personalized media content service. Upon user's approval of new information channels to be added to the client, the interface is automatically updated to incorporate the suggestions.

For statistical usage, each interaction between the user and the interface is reported to the proxy as an event.

The architecture of the user also uses XML to seamlessly configure the interface and supply relevant information within the interface. This allows for a fast modification of the interface when messages within the platform need to be accommodated.

The Database stores statistics (active/inactive clients, services unavailability, errors, etc).

The database stores users' registrations.

The Web Administration Portal enables addition, modification and removal of new services to be fetched by the proxy and incorporated within the user's interface.

By default, a set of services is integrated within the interface. Afterwards, based in the user's usage of the system further suggestions are performed by the system to the client and submitted for his or her approval.

Emergency contacts and relevant events are also inserted within the Web Administration Portal in order to be fetched by the proxy and shown within the user interface.

Administration statistics are also visualized within the web administration portal.

In the Web Administration Portal, along with the addition, modification and removal of services, the administrator is also able to catalogue each service in a directory, named Catalogue Directory, with levels of information, information related time, user's reference and location-related information. The Catalogue Directory is used within the Statistics Analyzer to suggest the information channels that best fit the user's profile.

Events performed by the user and stored within the database are analyzed. After analysis, new service suggestions for each user are made and stored within the database for future proxy retrieval.

The process by which the user profile is built and suggestions are made is hereinafter described:

The organization of information in each information channel ("channel") shall be executed based on Interaction Time in each information level. Most used items shall be displayed in greater focus, causing the remaining items to be in lesser focus.

E.g., if Economy News are the most accessed in the News Channel then such item will appear in greater focus than the Neighborhood News, as well as the remainder.

The update of the channel disposition shall be done by a content server when the application is updated.

In the Intelligent Suggestions Channel there are suggestions of content according to the user's profile. The user's profile is defined based on every click of the user in the channels.

The Intelligent Suggestions Channel is defined by the following process:

1—Previous Information Cataloguing

All information related to the user, channels and associated hyperlinks is categorized in a hierarchical way.

The user have access to several categories or associated category hierarchy. Geography is a good example. E.g. a user in "Lisbon", shall implicitly be under "Portugal", which on its hand is under "Europe".

The categorization of the channels and associated hyperlinks can be exemplified again by the News Channel. The user can click on "News" and then click on one of the sub-level, which for example can include "Economics" and "International".

Categorization shall also employ time variables, such as the day of the week on which the click occurred (1-7), if it is a working day, weekend or holiday. It will also employ the date on which the click took place, decomposing the date in the categories "year", "month", "day", "hour" and "minute".

2—User Profile Definition

The user profile is obtained resorting to Data Mining Clustering Techniques applied to the interaction records and their categories. Clustering is the partitioning of a data set into subsets (clusters), so that the data in each subset is similar within a parameterized distance. Each cluster that is obtained shall stand for a user profile.

As an example, consider a list of records from 3 users whose identifiers (ID) are 174, 175 and 176. The first record in FIG. 4 is from user 175 and was recorded at Jan. 1, 2007 at 10:12 in the path "News"→"Economics"→"Microeconomics". This hierarchy is represented by the columns "Pag. Level 1"=1="News", "Pag. Level 2"=2="Economics", and "Pag. Level 3"=1="Microeconomics".

The geographic location of the user is represented in a hierarchical way by "User Space 1"="Africa", "User Space 2"="Angola", "User Space 3"="Luanda". When possible, the information in the channel the user accessed is also geographically categorized; in this example it is done by "Content Space 1"="Africa", "Content Space 2"="Angola", "Content Space 3"="Luanda".

3—Intelligent Suggestions Channel

After defining the Cluster (profile) to which the user belongs, the channels to be suggested to the user are determined by analysis of all the "Pag. Level" categories and Interaction Time.

For each channel path in the cluster a sequence of probabilities is defined in regard to the user being likely to go full depth on a path or not. This allows for a prediction of the probability of the user following a determined hyperlink.

The set of paths for final hyperlinks in a cluster can be represented via a hypergraph. Each cluster record being a hyperedge of the hypergraph. A hypergraph $H=(V,E)$ is a set of vertexes V and a set of hyperedges E, representing a graph extension in which each edge can connect to more than two vertexes.

For example, if {p1="News", p2="Economics", p3 "Microeconomics"} is a record in the cluster, then the hypergraph will include the hyperedge which connects p1 to p2 and p3. Next, a determined weight will be linked to each hyperedge, calculated from the Page Levels probability, and weighted with Interaction Time.

Finally, to determine the suggestion to be submitted to the user, first the cluster to which the user belongs is identified and then the hyperlink (hyperedge) with the greatest relevance (weight) is suggested. If this hyperlink was already one of the most visited by the user, then the next most relevant hyperlink is selected until it is not one of the most relevant to the user.

Suppose that the bold records in FIG. 4 form a cluster. In order to determine the weights, we first calculate the probability of each hyperedge in the cluster and then multiply it by the average of its interaction times, as presented in FIG. 5.

The hyperedge with higher weight is the suggestion to the user.

In this example, the hyperlink suggested to the user is 2-3-1.

The specific element that determines geo-referenced information may vary from provider to provider. For instance, a good implementation can be achieved through zone codes in some areas. The method by which location is provided can vary.

The exemplary embodiments of the present invention, including the processes described above, can be written as computer programs and can be implemented in general-use digital computers that execute the programs using a computer readable recording medium and other types of transmission media. Examples of the computer readable recording medium include magnetic storage media (e.g., ROM, floppy disks, hard disks, etc.), and optical recording media (e.g., CD-ROMs, or DVDs). Other types of transmission media can include carrier waves (e.g., transmission through the Internet).

The foregoing embodiments are merely exemplary and are not to be construed as limiting the present invention. The present teaching can be readily applied to other types of apparatuses.

Additional aspects of exemplary embodiments of the invention will become apparent to those skilled in the art upon examination of the description, or may be learned by practice of the invention. The examples and drawings herein are provided by way of illustration, and are not intended to be limiting of the scope of the present invention.

What is claimed is:

1. An information system based on time, space and relevance, said system comprising: a client that displays information in a user-friendly manner; a proxy that handles the collection and parsing of data; a server that gathers usage data from the client; a data mining cluster that allows for user profiling and time, space and relevance analysis; a set of information channels, which are periodically updated, and upon which automatic suggestions are given based on a user profile.

2. The system according to claim 1, wherein the client is a thin client.

3. The system according to claim 1, wherein the proxy is divided between the client and the server.

4. The system according to claim 1, wherein the data handled by the proxy is in extensible markup language (XML) format.

5. An information system, said information system comprising: at least one client that displays information related to a plurality of information channels; a data mining cluster which performs user profiling and time, space and relevance analysis, wherein suggestions are provided to said at least one client based on a user profile and said time, space, and relevance analysis, and wherein said plurality of information channels are updated based on said suggestions.

6. The system, according to claim 5, wherein the at least one client is a thin client.

7. The system according to claim 5, wherein said at least one client comprises a proxy that collects and parses data.

8. The system according to claim 5, wherein said plurality of information channels are periodically updated.

9. The system according to claim 5, wherein said suggestions are automatically provided to said at least one client.

10. The system according to claim 7, wherein the data collected by the proxy is in extensible markup language (XML) format.

11. A client device for obtaining information based on time, space and relevance analysis received from a data mining cluster, said device comprising: at least one user interface for entering data; a screen for displaying said information; an input/output unit for receiving said information and transmitting said data, wherein automatic suggestions are received, via said input/output unit, based on a user profile and said time, space, and relevance analysis.

12. The client device according to claim 11, wherein the client device is a thin client device.

13. The client device according to claim 11, further comprising a proxy for pre-fetching said information.

* * * * *